Dec. 9, 1924.
N. T. SHORTS
VEHICLE SIGNAL
Filed Dec. 18, 1922
1,518,366
2 Sheets-Sheet 2
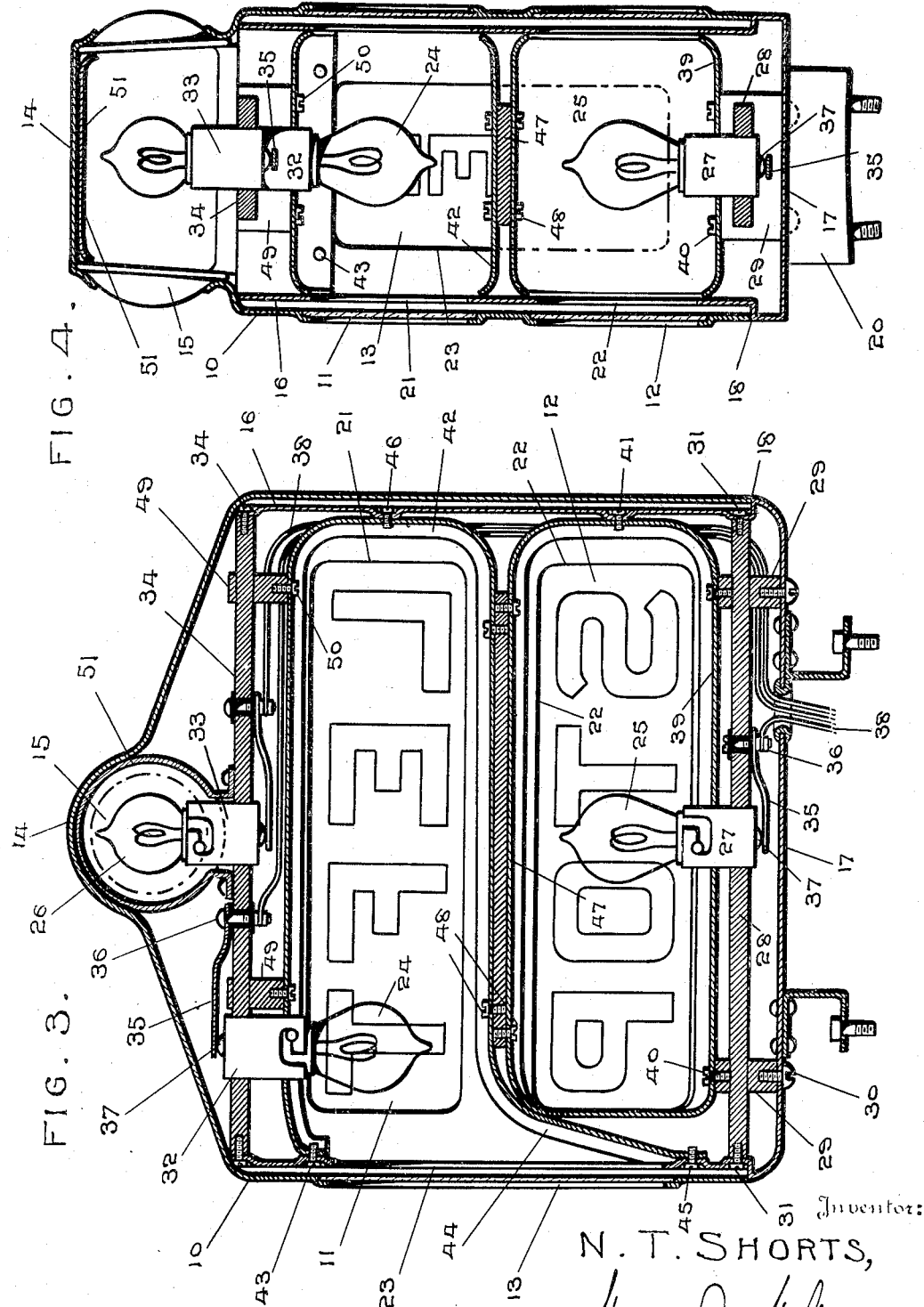

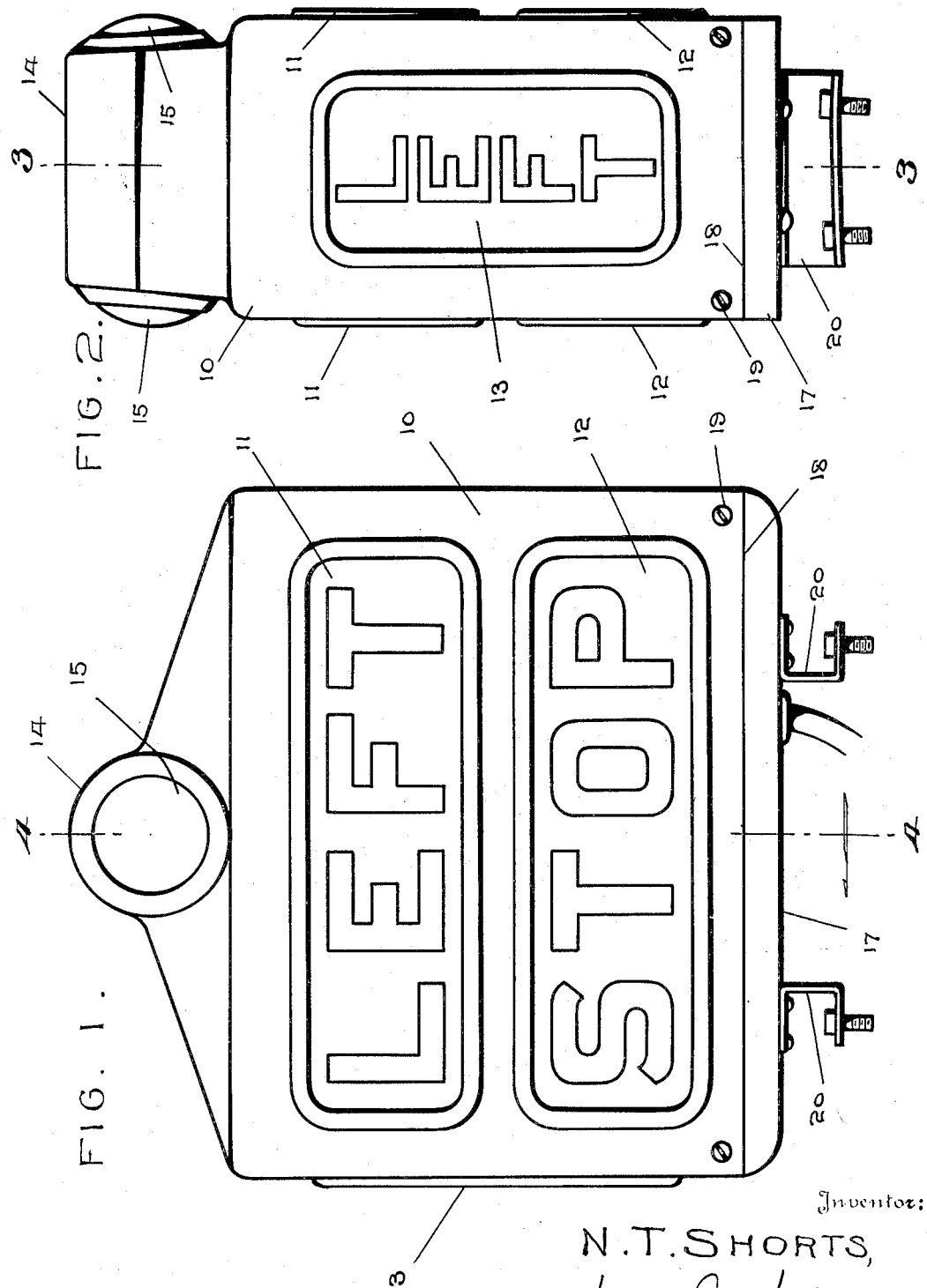

Patented Dec. 9, 1924.

1,518,366

UNITED STATES PATENT OFFICE.

NELSON TALMAGE SHORTS, OF FERN, PENNSYLVANIA.

VEHICLE SIGNAL.

Application filed December 18, 1922. Serial No. 607,559.

*To all whom it may concern:*

Be it known that I, NELSON TALMAGE SHORTS, a citizen of United States, residing at Fern, in the county of Clarion and State of Pennsylvania, have invented certain new and useful Improvements in Vehicle Signals, of which the following is a specification, reference being had therein to the accompanying drawing.

The present invention relates to traffic signals or semaphores intended to be carried by automobiles and other vehicles for indicating the intentions of the driver of a vehicle to turn or slow down, and the invention aims to provide an electrically-illuminated signal device of that kind comprising a novel construction and assemblage of the component elements.

Another object is the provision of novel means for mounting or supporting the electric lamps, reflectors and other parts in a simple and effective manner.

A further object is the provision of such a device having a novel arrangement whereby a single lamp or source of light will illuminate horizontal and vertical signal panels at different sides.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a rear view of the signal device.

Fig. 2 is a side elevation thereof.

Fig. 3 is a vertical section on the line 3—3 of Fig. 2.

Fig. 4 is a vertical section on the line 4—4 of Fig. 1.

The casing 10 is of sheet metal and is provided at its front and rear walls with the upper and lower horizontal signal panels 11 and 12, respectively, containing the words Left and Stop, or their equivalents, and the casing is provided at its outer side or end with a vertical signal panel 13 also containing the word Left reading vertically downward, the panel 13 being disposed vertically so that the casing need not be of large dimensions between its front and rear walls. The panel 13 extends above and below the horizontal planes of the adjacent edges of the panels 11 and 12, whereby the vertical panel 13 can be of a height almost or substantially equal to the superposed horizontal panels, thus providing a compact arrangement by disposing the panel 13 vertically beyond the ends of the upper and lower horizontal panels. The top of the casing is provided with an arched portion 14 extending forwardly and rearwardly, and provided at its ends, in the front and rear walls of the casing, with the lenses 15 to provide a parking light, the front lens 15 being preferably white or clear and the rear lens red to comply with parking light regulations without other lights on the vehicle being necessary. The bottom of the casing is open, to enable the casing to be slipped down on the lamp structure.

The lamp structure comprises an upright skelton frame 16, constructed of sheet metal and of an outline similar to but smaller than the casing to permit the casing and frame to be telescoped together. The skeleton frame has a base 17 conforming to the contour of the casing 10, with a marginal shoulder or seat 18 on which the lower edge of the casing 10 is seatable, the base or bottom 17 closing the casing when the parts are assembled. The casing 10 can be secured in place by means of screws 19, or the like, engaging through the lower edge portion of the casing and into the skeleton frame.

The signal device can be supported on the vehicle in any suitable manner, such as by means of supporting brackets 20 secured to the base or bottom 17 and adapted to be secured on the left rear wheel fender or other suitable supporting member of the vehicle. As shown, the brackets 20 are of channel-shaped sheet metal extending across the bottom 17.

The front and rear walls of the skeleton frame 16 have the upper and lower horizontal openings or windows 21 and 22 respectively, registering with the panels 11 and 12, and the outer side or end wall of the frame has the vertical opening or window 23 registering with the panel 13, for the illumination of the panels by the sources of light within the frame. The panels may be of glass having the signal words or indications painted or otherwise printed thereon, or may be of stenciled construction, according to established practice.

Carried by the frame 16 is an electric lamp or bulb 24 for illuminating the panels 11 and 13, an electric lamp 25 to illuminate the panels 12, and another lamp or bulb 26 for illuminating the lenses 15.

The plug of the lamp 25 is received by a lamp socket 27 secured to and supported by a supporting bar 28 located between and parallel with the front and rear walls of the frame and casing, and said bar extends slidably through the supporting blocks 29 which seat on the bottom or base 17, being secured to said bottom or base by the screws 30. The ends of the bar 28 also abut the end or side walls of the frame 16 immediately adjacent to the shoulder or seat 18 and are secured to said walls by screws 31. The lower lamp 25 is thus supported between the panels 12, with the lamp upstanding from the bar 28 located lower down than said panels.

Lamp sockets 32 and 33 are provided for the reception of the plugs of the lamps 24 and 26, respectively, and said sockets are secured to and carried by an upper supporting bar 34 within the upper edge portion of the frame 16 above and parallel with the lower supporting bar 28. The ends of the bar 34 abut the end or side walls of the frame 16 and are secured thereto by means of the screws 34, or the like, thereby supporting the lamps 24 and 26 and their sockets. The lamp 24 depends from the bar 34 while the lamp 26 is in upstanding position above said bar, the sockets 32 and 33 opening downwardly and upwardly, respectively.

The sockets 27, 32 and 33 are grounded to the frame and casing, by being secured to the bars 28 and 34, respectively, thereby grounding one terminal of each lamp, and individual electrical circuits are provided for the several lamps. Thus, spring tongues 35 are secured to the bars 28 and 34 by means of insulated binding posts 36, to engage the central insulated contacts 37 of the sockets, and the conductors or wires 38 for the several lamp circuits are connected to said binding posts 36. The circuits are supplied with electrical energy from a battery or generator (not shown) and the circuits are closed through the mediums of suitable switches (not shown) whereby the lamps can be selectively lighted. The wires 38 are led downwardly through an aperture in the bottom 17.

In order to confine the light of the lamp 25 to the panels 12, a horizontally elongated or rectangular reflector 39 is disposed between the front and rear walls of the frame 16, the reflector being of sheet metal and having its edge portions surrounding the openings 22 and preferably turned or curved toward the openings. The inner surfaces of the reflector are polished or finished to reflect the light rays from the lamp to the panels 12. The reflector surrounds the lamp 25 and concentrates the light on the panels 12, the socket 27 extending upwardly through the bottom of said reflector. The bottom of the reflector seats on the blocks 29, and is secured thereto by means of screws 40, or the like, thereby supporting the reflector firmly, the inner end of the reflector being secured to the inner wall of the frame 16, by means of a screw 41, or the like.

A reflector 42 is provided for the lamp 24 and panels 11 and 13, being of sheet metal and having its inner surfaces polished to reflect the light. The reflector 42 has that end thereof adjacent to the panel 13 open for the passage of light from the lamp 24 to the panel 13. The reflector 42 has an upper horizontal portion above the openings 21 and panels 11, the lower horizontal portion below said openings and panels, and a vertical portion between the ends of the horizontal portions at the inner side or end of the frame, closing the inner end of the reflector. The outer terminal of the upper horizontal portion of the reflector is secured to the outer end or side wall of the frame 16, as at 43, above the opening 23, while the outer terminal of the lower horizontal portion of the reflector extends downwardly at an angle, as at 44, and is secured, as at 45, to the outer end wall of the frame below the opening 23. Thus, the outer end of the reflector 42 is open and elongated vertically to correspond with the vertical elongation of the opening 23 and panel 13. The lamp 24 is located adjacent to the open outer end of the reflector 42, between the panels 11, so as not only to illuminate said panels 11, but to also illuminate the panel 13, the downturned terminal portion 44 of the bottom or lower portion of the reflector 42 permitting the light rays to pass directly downward to the lower portion of the panel 13. The edge portions of the reflector 42 are curved or turned toward the openings 21 and 23, and the outer end of the reflector 39 is spaced from the outer end wall of the frame 16, to accommodate the portion 44 of the upper reflector. The inner closed end of the reflector 42 is secured to the inner end wall of the frame 16 by means of the screw 46, or the like, and the reflector 42 provides an intermediate brace between the walls of the frame 16 located between the upper and lower bars 34 and 28, respectively.

The reflectors 39 and 42 are connected, to make the structure rigid and substantial. Thus, a reenforcing bar 47 is disposed between the upper portion or top of the reflector 39 and the lower horizontal portion or bottom of the reflector 42, and said reflectors are secured to said bar by means of the screws 48, or the like.

The upper portion or top of the reflector 42 is also secured to the bar 34. Thus, blocks 49, similar to the blocks 29, are fitted slidably on the upper supporting bar 34 and bear on top of the reflector 42, which is secured to said blocks by means of the screws 50 or the like.

A cylindrical reflector 51 surrounds the parking lamp 26 and is located under the arched portion 14 of the casing, with its ends registering with the lenses 15, whereby to concentrate the light of the lamp 26 on said lenses. Said reflector 51 is secured on the upper supporting bar 34.

The lamp 25 is lighted when it is the intention of the operator of the vehicle to slow down or stop, thereby illuminating the panels 12 at the front and rear, to warn others both in front and in rear. The lamp 24 is lighted when the operator intends to turn to the left, and the panels 11 being illuminated can be noticed from in front and in rear of the vehicle. Also, at the same time, the panel 13 being illuminated at the outer end or side of the casing, will give the signal to others at the left of the vehicle toward which the turn is to be made, in order to avoid confusion and misunderstanding, and giving notice of the left turn in all the directions necessary, that is, front, rear and to the left, it being essential that in making a left turn at a crossing or elsewhere that the traffic officer and others to the left of the vehicle be advised as well as persons in front and in rear of the vehicle.

The lamp 26 is lighted when parking the vehicle during the night time, so as not to require the head and tail lights to be turned on, while parking, and combining the parking lamp with the signal device.

By loosening and removing the screws 19, the casing 10 can be conveniently lifted off of the lamp structure, giving access to the lamps and other parts for replacing the bulbs when burnt out or for making adjustments or repairs.

Having thus described the invention, what is claimed as new is:—

1. A signal device comprising a casing having superposed horizontal panels and a vertical panel in different walls thereof, said vertical panel extending above and below a horizontal plane between the horizontal panels, a lamp in the casing for illuminating one of the horizontal panels and the vertical panel, and a reflector in the casing partly surrounding said horizontal panel and having an open end registering with the vertical panel, said reflector having terminal portions extending to the upper and lower ends of the vertical panel and one of said terminal portions being located between the vertical panel and the other horizontal panel.

2. A signal device comprising a casing having superposed horizontal panels in one wall and a vertical panel in another wall, said vertical panel extending above and below a horizontal plane between the horizontal panels, a lamp in the casing for one horizontal panel, a reflector in the casing surrounding said panel and lamp, a lamp in the casing for the other horizontal panel and the vertical panel, and a reflector in the casing partly surrounding the second named horizontal panel and having an open end registering with the vertical panel, with terminal portions extending to the upper and lower ends of said vertical panel, one of said terminal portions extending at an angle between the vertical panel and the first named reflector.

3. A signal device comprising a skeleton frame including a supporting bar, blocks slidably fitted on said bar, a reflector secured to said blocks, and a lamp socket carried by said bar for supporting a lamp within said reflector.

4. A signal device comprising a skeleton frame having parallel supporting bars, reflectors located between and secured to said bars and to one another, and lamp sockets carried by said bars for supporting lamps in said reflectors.

5. A signal device comprising an upright skeleton frame having upper and lower supporting bars, upper and lower reflectors between said bars having their adjacent portions secured together, blocks slidably fitted on said bars and secured to the upper and lower portions of the upper and lower reflectors, respectively, and lamp sockets carried by said bars for supporting lamps in said reflectors.

6. A signal device comprising an upright skeleton frame having horizontal openings in one wall, one above the other, and having a vertical opening in another wall, a reflector surrounding one of said horizontal openings, another reflector partly surrounding the other horizontal opening and having its terminals extending to the upper and lower ends of the vertical opening, said reflectors being disposed in and supported by said frame, lamps carried by the frame within said reflectors, and a casing to slip down on said frame and having horizontal and vertical panels to register with said openings, one terminal portion of the second named reflector extending at an angle between the vertical opening and the corresponding end of the first named reflector.

In testimony whereof I hereunto affix my signature.

NELSON TALMAGE SHORTS.